(12) United States Patent
Vercellesi

(10) Patent No.: US 12,110,126 B2
(45) Date of Patent: Oct. 8, 2024

(54) METHOD FOR MANUFACTURING A SOUND-ABSORBING SANDWICH PANEL FOR REDUCING NOISE OF AN AIRCRAFT ENGINE

(71) Applicant: LEONARDO S.p.A., Rome (IT)

(72) Inventor: Marco Vercellesi, Milan (IT)

(73) Assignee: LEONARDO S.p.A., Rome (IT)

( * ) Notice: Subject to any disclaimer, the term of this patent is extended or adjusted under 35 U.S.C. 154(b) by 278 days.

(21) Appl. No.: 17/598,534

(22) PCT Filed: Mar. 27, 2020

(86) PCT No.: PCT/IB2020/052900
§ 371 (c)(1),
(2) Date: Sep. 27, 2021

(87) PCT Pub. No.: WO2020/201951
PCT Pub. Date: Oct. 8, 2020

(65) Prior Publication Data
US 2022/0177152 A1 Jun. 9, 2022

(30) Foreign Application Priority Data
Mar. 29, 2019 (IT) .................. 102019000004761

(51) Int. Cl.
*B29D 99/00* (2010.01)
*B32B 3/12* (2006.01)
(Continued)

(52) U.S. Cl.
CPC ......... *B64D 33/02* (2013.01); *B29D 99/0021* (2013.01); *B32B 3/12* (2013.01);
(Continued)

(58) Field of Classification Search
CPC ............ B64D 33/02; B64D 2033/0206; B29D 99/0021; B32B 3/12; B32B 3/266;
(Continued)

(56) References Cited

U.S. PATENT DOCUMENTS 4,759,513 A 7/1988 Birbragher
4,817,756 A 4/1989 Carr et al.
(Continued)

FOREIGN PATENT DOCUMENTS

CA 2628670 A1 10/2008
CA 3065742 A1 * 12/2018 ............. B32B 27/34
(Continued)

OTHER PUBLICATIONS

Machine Translation of CA-3065742-A1 (Year: 2018).*
(Continued)

*Primary Examiner* — Forrest M Phillips
*Assistant Examiner* — Jennifer B. Olson
(74) *Attorney, Agent, or Firm* — Ferguson Case Orr Paterson

(57) ABSTRACT

A method for manufacturing a sound-absorbing panel with a sandwich structure for reducing noise impact of an aeronautic engine includes providing a first skin of a thermoplastic polymeric material, making a plurality of microholes through the first skin by mechanical punching of the first skin, securing the first skin to a central layer by arranging a structural adhesive layer between the first skin and the central layer and/or by a thermal weld between the first skin and the central layer, and securing the central layer to a second skin by arranging a structural adhesive layer between the central layer and the second skin and/or by a thermal weld between the central layer and the second skin.

18 Claims, 2 Drawing Sheets

(51) Int. Cl.
 *B32B 3/26* (2006.01)
 *B32B 7/12* (2006.01)
 *B32B 27/08* (2006.01)
 *B32B 37/12* (2006.01)
 *B32B 38/00* (2006.01)
 *B32B 38/04* (2006.01)
 *B64D 33/02* (2006.01)

(52) U.S. Cl.
 CPC ............... *B32B 3/266* (2013.01); *B32B 7/12* (2013.01); *B32B 27/08* (2013.01); *B32B 37/12* (2013.01); *B32B 38/04* (2013.01); *B32B 2038/0076* (2013.01); *B32B 2038/042* (2013.01); *B32B 2250/03* (2013.01); *B32B 2250/24* (2013.01); *B32B 2250/40* (2013.01); *B32B 2305/024* (2013.01); *B32B 2305/77* (2013.01); *B32B 2307/102* (2013.01); *B32B 2307/732* (2013.01); *B32B 2605/18* (2013.01); *B64D 2033/0206* (2013.01)

(58) Field of Classification Search
 CPC .......... B32B 7/12; B32B 27/08; B32B 37/12; B32B 38/04; B32B 2038/0076; B32B 2038/042; B32B 2250/03; B32B 2250/24; B32B 2250/40; B32B 2305/024; B32B 2305/77; B32B 2307/102; B32B 2307/732; B32B 2605/18; B32B 37/0076; B32B 2262/101; B32B 2307/54; B32B 2307/558; B32B 2307/714; B32B 15/085; B32B 15/088; B32B 15/09; B32B 15/20; B32B 27/281; B32B 27/285; B32B 27/286; B32B 27/288; B32B 27/32; B32B 27/34; B32B 27/36; B32B 27/365; B32B 27/38; B32B 27/42; B32B 43/00; B32B 43/003

USPC .................................................. 181/192, 292
 See application file for complete search history.

(56) References Cited

U.S. PATENT DOCUMENTS 6,609,592 B2 * 8/2003 Wilson ................. B23K 26/389
  181/292
 7,631,483 B2 12/2009 Mani et al.
 7,640,961 B2 1/2010 Stubner et al.
 8,763,753 B2 * 7/2014 Kray ......................... F02C 7/24
  181/292
 9,194,293 B2 11/2015 Napier
 9,273,631 B2 * 3/2016 Vavalle ................. B29C 70/545
 9,856,030 B2 1/2018 Braden et al.
 2005/0060982 A1 3/2005 Mani et al.
 2005/0082112 A1 4/2005 Harrison
 2009/0025860 A1 * 1/2009 Midali .................... F02C 7/045
  156/182
 2013/0075193 A1 3/2013 Vavalle
 2015/0315972 A1 11/2015 Umbab et al.
 2018/0016981 A1 * 1/2018 Herrera ............. B29D 99/0021

FOREIGN PATENT DOCUMENTS

CN 105346152 A 2/2016
 EP 2017077 A2 1/2009
 GB 2452476 B 3/2009

OTHER PUBLICATIONS

International Search Report, issued in PCT/IB2020/052900, mailed Jul. 3, 2020, Rijswijk, NL.
Written Opinion, issued in PCT/IB2020/052900, mailed Jul. 3, 2020, Rijswijk, NL.

* cited by examiner

METHOD FOR MANUFACTURING A SOUND-ABSORBING SANDWICH PANEL FOR REDUCING NOISE OF AN AIRCRAFT ENGINE

CROSS-REFERENCE TO RELATED APPLICATIONS

This application is a National Phase Application of PCT International Application No. PCT/IB2020/052900, having an International Filing Date of Mar. 27, 2020 which claims the benefit of priority to Italian Patent Application No. 102019000004761, filed Mar. 29, 2019, each of which is hereby incorporated by reference in its entirety.

FIELD OF THE INVENTION

The present invention relates to a method for manufacturing a sound-absorbing panel for aeronautical use and a relative sound-absorbing panel.

BACKGROUND OF THE INVENTION

The use of sound-absorbing panels is generally known in the aeronautical field, particularly when arranged on the engine nacelle around the engine in order to absorb the dispersed sound power thereof. Usually, sound-absorbing panels have a so-called "sandwich" structure, or a structure comprising a pair of outer skins with a central layer in between. Typically, the central layer is made with a honeycomb structure, and the skin facing the engine is provided with a plurality of holes; in this way, the sound wave can enter into the central layer and remain confined in the volumes of the honeycomb structure, also called resonance chambers. The layers of outer skin are usually made of composite materials with a thermosetting matrix, such as epoxy resins, or of aluminium.

A sound-absorbing panel for aeronautical use is known, for example, from U.S. Pat. No. 9,856,030 B2, FIG. 1 of which shows a sound-absorbing panel having a first perforated skin, an intermediate layer with a honeycomb structure and a second skin.

Further examples of sound-absorbing panels for aeronautical use are shown, for example, in patent publications CN 105346152 A, GB 2,452,476 B, U.S. Pat. Nos. 4,817,756 A, 7,631,483 B2, 7,640,961 B2, 9,194,293 B2, US 2005/0060982 A1, US 2005/0082112 A1, US 2015/0315972 A1 and EP 2,017,077 A2. The latter document, in particular, shows the possibility of using different materials, but not that of using thermoplastic materials for making the perforated skin. In fact, use of such thermoplastic materials is complicated by the difficulties of gluing layers of thermoplastic material to layers of a different material, such as aluminum, a material with a meta-aramid base, or a composite material with a phenolic resin base reinforced with glass fibres.

In order to make the holes in the skin facing the engine, a laser drilling process is normally used, since the cheaper conventional mechanical punching process is not suitable for machining composite materials. In fact, the drilling of composite materials can involve a series of specific problems and defects of the material, such as delamination (namely, the separation of the layers of materials from one another) and fragmentation (namely the fraying of the reinforcement fibres in the area of the hole). In fact, mechanical drilling of a composite material causes the fracture of the fibre part of the material and heat generated during machining becomes a problem for the resin phase of the material since composite materials, being poor conductors of heat, do not produce chips. Consequently, in order to achieve precise cuts, a specific approach must be adopted in terms of tools and methods, which means that making sound-absorbing panels of composite material is by no means an economical process.

SUMMARY OF THE INVENTION

The aim of the present invention is to provide a method for manufacturing sound-absorbing panels for aeronautical use that does not have the disadvantages of the state of the art.

These and other aims are fully achieved according to the present invention by a manufacturing method as described and claimed herein.

Advantageous embodiments of the present invention are also described.

In short, the present invention is based on the idea of not using a first skin of composite material to be drilled according to the specific techniques of drilling composite materials, but rather a first skin of a thermoplastic polymeric material, through which a plurality of micro-holes are initially made in a conventional manner by means of a mechanical punch, and which is then secured to the other components of the sound-absorbing panel by means of a thermal welding and/or gluing process, possibly supported by a co-curing or copolymerization or so-called co-bonding process (co-curing supported by interposing an adhesive layer).

By virtue of the possibility of making a plurality of micro-holes in a conventional manner, the cost of producing a sound-absorbing panel is, thus, significantly reduced.

Furthermore, thanks to the use of thermal welding and/or gluing, it is possible to glue a layer of thermoplastic material to materials of different types.

BRIEF DESCRIPTION OF THE DRAWINGS

The characteristics and advantages of the present invention will emerge more clearly from the following detailed description, given by way of non-limiting example with reference to the accompanying drawings, in which.

DETAILED DESCRIPTION

Figure 1:
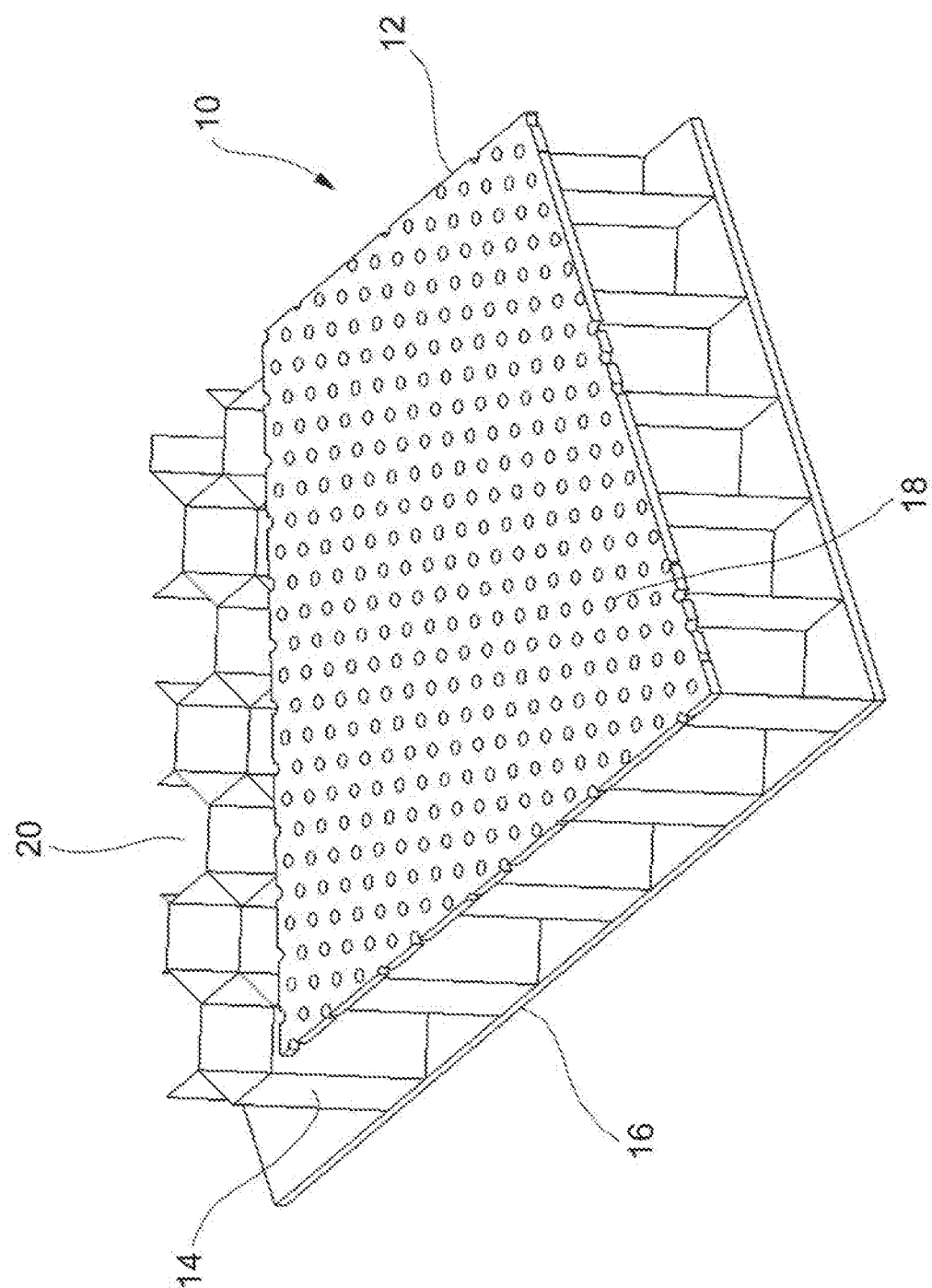
FIG. 1 is a perspective view of a sound-absorbing panel in partial cross-section.
Figure 2:
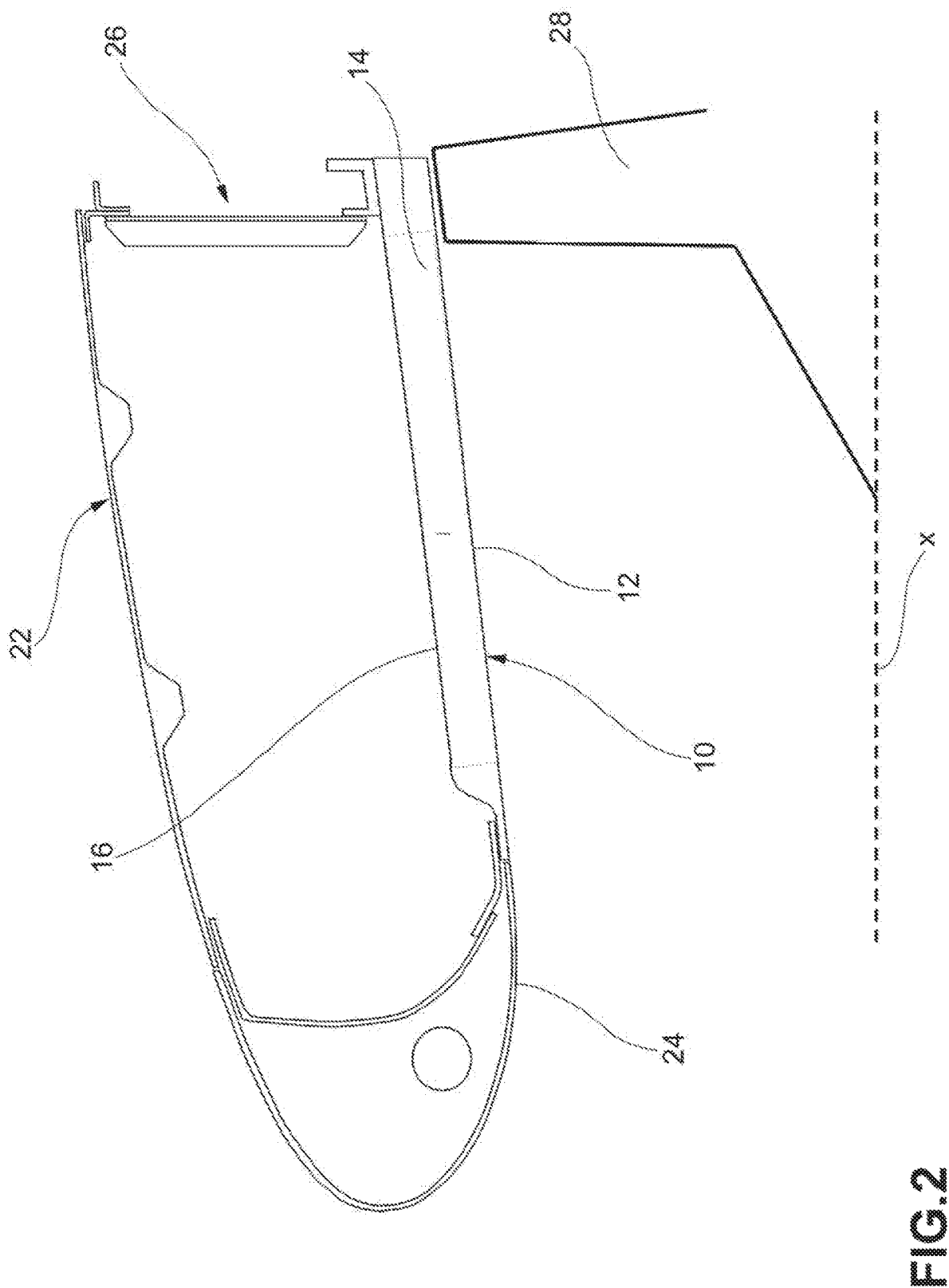
FIG. 2 is a cross-sectional view of part of an engine nacelle having a sound-absorbing panel.

With reference to FIGS. 1 and 2, a sound-absorbing panel with a sandwich structure for reducing the noise impact of an aeronautical engine is generally indicated by 10. The sound-absorbing panel 10 comprises a first skin 12, a central, or intermediate (also known as a core) layer 14 and a second skin 16.

The sound-absorbing panel 10 may be used to form an insulating covering having a substantially cylindrical shape, or a shape suitable for at least partially surrounding a nacelle of an aeronautical engine. For example, in one embodiment, the sound insulation of the aeronautical engine is obtained by joining a plurality of sound-absorbing panels 10 having the shape of portions of cylindrical surfaces. In other embodiments, the sound-absorbing panel may have a substantially flat shape, or be slightly curved.

The first skin 12 has a generally thin, or film-like structure, or has a much smaller thickness than the two other dimensions and, when the sound-absorbing panel 10 is fitted for use, it is arranged to face the sound source; in particular, the first skin 12 is facing the engine, in a radially internal direction of the nacelle.

The first skin 12 may be made of different thermoplastic polymer materials. In some non-limiting embodiments described purely by way of example, the first skin 12 may be made of a thermoplastic polymer material selected from the group consisting of: PEEK (polyether-ether-ketone), PEK (polyether-ketone), PEI (polyether-imide), nylon, PET (polyethylene terephthalate), PAEK (poly-aryl-ether-ketone), PPS (poly-paraphenyl-sulphide), PA (poly-amide), PPSU (poly-phenyl-sulfone), PC (poly-carbonate) and PP (polypropylene).

The first skin 12 may, preferably, have a thickness comprised between about 300 and about 1500 micrometres. Yet more preferably, the first skin 12 has a thickness comprised between about 500 and about 1200 micrometres.

The first skin 12 is provided with a plurality of micro through-holes 18, made by means of a conventional mechanical punching process, and distributed over its entire area. The micro-holes 18 are adapted to enable the passage of sound waves from the outside of the sound-absorbing panel 10 to its central layer 14. These micro-holes 18 may be variously distributed over the surface of the first skin 12.

Preferably, the micro-holes 18 are distributed in a regular and repetitive pattern, for example in offset rows as shown in FIG. 1. Preferably, the micro-holes 18 cover a percentage of the area of the first skin 12 comprised between about 3% and about 50%, and more preferably between about 3% and about 15%. Preferably, the diameter of the micro-holes 18 is comprised between about 100 micrometres and about 3000 micrometres. Yet more preferably, the micro-holes 18 have a diameter comprised between about 1000 and about 1500 micrometres. However, both the percentage of area covered by the micro-holes 18 and their diameter may be smaller or larger than described herein purely by way of non-limiting example. The diameter and number of micro-holes 18 depend on the nature of the noise to be counteracted. For this reason, different micro-holes 18 will be used in different parts of an aeronautical engine. For example, while some diameters and opening percentages shall be used in the front part of the engine (depending on the noise that is propagating forwards), different percentages and diameters must be used in the engine's bypass duct, depending on the frequencies and propagation of the noise consistent with the airflow.

The thickness of the first skin 12, the number of micro-holes 18 and the diameter thereof are calculated depending on the nature (level and frequencies) of the noise to be reduced through a set of mathematical models validated with experimental tests owned by the Applicant. The ideal first skin 12 is then assessed for mechanical resistance and maintainability and reparability requirements. The optimum range is defined by drawing a compromise between acoustic performance, which would require a minimum thickness, and resistance performance.

In general, the dimensional ranges described herein with respect to the diameter of the micro-holes 18, the percentage of micro-holes 18 on the first skin 12, and the thickness of the first skin 12 are particularly suitable for applications in civil aircraft.

The central layer 14 may be made of several materials. Purely by way of non-limiting example, the central layer 14 may be made of a thermoplastic polymer material, aluminium, a composite material with a phenolic resin matrix reinforced with glass fibres, or a material with meta-aramid, such as Nomex®. The central layer 14 preferably has a known honeycomb structure.

In any event, the central layer 14 is made in such a way to define a vertical separation of volumes, as shown for example in FIG. 1. Together with the first skin 12 and the second skin 16, the volumes define a plurality of resonance chambers 20. In another embodiment, the central layer 14 may have a three-dimensional structure formed by a plurality of walls that are mutually converging and/or intersecting, adapted to distance the first skin 12 from the second skin 16, and to define, between them, a plurality of cavities, or resonance chambers 20, of variable geometry, each in communication with the outside of the sound-absorbing panel 10 through at least one micro-hole 18 of the first skin 12. In this particularly preferable latter embodiment, also the central layer 14 is made of a thermoplastic material.

The second skin 16 has a generally thin, or film-like structure, or a much smaller thickness than the two other dimensions and, when the sound-absorbing panel 10 is fitted for use, it faces the side opposite the sound source; in particular, the second skin 16 faces the side opposite the engine, that is to say in a radially external direction in relation to the nacelle. The second skin 16 may be equal or equivalent to the first skin 12 in terms of thickness, area and shape, but has no micro-holes. The second skin 16 may be made, purely by way of non-limiting example, of a polymeric material, or of a composite material, for example with an epoxy resin matrix reinforced with fibres, for example carbon fibres. Non-limiting examples of materials suitable for making the second skin 16 are: epoxy resin and epoxy resin reinforced with fibres, bismaleimide resin and bismaleimide resin reinforced with fibres, cyanate esters and cyanate esters reinforced with fibres, and polyimide and polyimide reinforced with fibres. Advantageously, the second skin 16, the central layer 14 and the first skin 12 are all made with the same thermoplastic material.

By virtue of the presence of micro through-holes 18, the sound can pass through the first skin 12 and reach the inside of the sound-absorbing panel 10, entering the resonance chambers 20, where it remains confined due to the continuous and un-holed surface of the second skin 16, thus enabling a significant reduction in the sound power dispersed.

As shown in particular in FIG. 2, the sound-absorbing panel 10 may be fitted in an engine nacelle 22, for example on an internal side 24 of one of its air intakes 26. In particular, FIG. 2 also shows a blade 28 of an engine turbine and a longitudinal axis x of the engine. As is clearly shown, the sound-absorbing panel 10 is mounted with the first skin 12 arranged towards the sound source, i.e. towards the engine, and with the second skin 16 arranged on the opposite side.

According to the present invention, the sound-absorbing panel 10 is obtained by securing together, two by two, the first skin 12 and the central layer 14, and the central layer 14 and the second 16 respectively. In particular, the method for manufacturing a sound-absorbing panel 10 according to the present invention comprises the following steps in sequence (noting that the lettering of the steps in this specification may differ from the lettering of the steps in the attached claims):

a) providing a first skin 12 of a thermoplastic polymeric material;

b) making a plurality of micro-holes 18 through the first skin 12 by mechanical punching;

c) securing the first skin 12 to a central layer 14 by arranging a structural adhesive layer between the first skin 12 and the central layer 14 and/or by a thermal weld between the first skin 12 and the central layer 14; and d) securing the central layer 14 to a second skin 16 by arranging a structural adhesive layer between the central layer 14 and the second skin 16 and/or by a thermal weld between the central layer 14 and the second skin 16.

Initially, a first skin 12 of a thermoplastic polymeric material is provided. This first skin 12 may be made by means of a process of thermoforming on mould of a thermoplastic polymeric film, or by means of a similar known process for obtaining a first thin skin 12 of a thermoplastic polymeric material.

Through the first skin 12 of thermoplastic polymeric material, a plurality of micro through-holes 18 are made by mechanical punching, or by an equivalent conventional mechanical process. This process is well known and will not be described in further detail. Advantageously, the mechanical punching for making the plurality of micro-holes 18 passing through the first skin 12 may be performed before the process of thermoforming the first skin 12. Alternatively, the mechanical punching for making the plurality of micro-holes 18 passing through the first skin 12 may be performed even after the process of thermoforming the first skin 12. The central layer 14 and second skin 16 are secured, in that order, to said first skin 12.

Advantageously, in an embodiment of the method according to the present invention, at least two adjacent components between the first skin 12, the central layer 14 and the second skin 16—and, preferably, all three components—are made of an uncured material, and step c) and/or step d) further comprise the step of:

e) having the first skin 12, the central layer 14, and the second skin 16 undergo a curing process in autoclave with vacuum bag, according to a specific pressure and temperature cycle, for co-curing the uncured components.

When the union between the components of the sound-absorbing panel 10 is achieved by co-curing, the first skin 12 is arranged, in a known way, on a curing bed. Then, the central layer 14 is arranged resting on the first skin 12. Finally, on the central layer 14, the second skin 16 is arranged. At this point, covering may take place with the typical bagging materials used in a curing process in autoclave with vacuum bag, such as a nylon film for high temperatures, a surface ventilation fabric of nylon or polyester and a separating film for high temperatures. They may be arranged, for example, manually in sequence on top of one another. Upon completion of the covering step, the application of vacuum onto the outermost layer of the curing bag may be performed to guarantee the adaptation of the bagging materials to the surfaces of the sound-absorbing panel 10, avoiding wrinkling and air bubbles.

Finally, the assembly comprising the first skin 12, the central layer 14 and the second skin 16 undergoes a co-polymerization, or co-curing, process. This process, which involves the application of a specific temperature and pressure cycle (typically, around 180° C. and 6 bar), is known and therefore not described in further detail. On completing the co-curing process, the first skin 12, the central layer 14 and the second skin 16 are connected to form a single sound-absorbing panel 10.

It is possible to glue thermoplastic materials to other components of aluminium, of a material with a meta-aramid base, or of a composite material with a phenolic resin base reinforced with glass fibres by suitable preparation of the surface to be glued and/or by the use of coatings (so-called primers).

Indeed, when performing step c) and/or step d), in order to secure together two-by-two the first skin 12 and the central layer 14 and/or the central layer 14 and the second skin 16 respectively, a structural adhesive layer may be arranged between the first skin 12 and the central layer 14 and/or between the central layer 14 and the second skin 16 respectively. For example, the adhesive film Loctite EA 9658 Aero (also known as Hysol EA 9658) may be used as a structural adhesive.

It is possible to use the structural adhesive directly to secure together two-by-two the first skin 12 and the central layer 14 and/or the central layer 14 and the second skin 16 by means of a simple gluing method or, alternatively it is possible to use the structural adhesive in the context of a co-curing or co-polymerization process, by means of a so-called co-bonding process.

Furthermore, when performing step c) and/or step d), it is also possible to perform a thermal weld between the first skin 12 and the central layer 14, in order to secure the first skin 12 to the central layer 14, and/or, between the central layer 14 and the second skin 16 respectively, in order to secure the central layer 14 to the second skin 16, both independently and together with the gluing process just described.

Using a thermal welding process to secure the first skin 12 made of thermoplastic material to other materials or to the same thermoplastic materials, enables making use of fillers having various and variable geometric cavities and forms, while conventional fillers limit the form of the cavity to a repetitive single geometry.

Clearly, the method according to the present invention is deemed equivalent when the order of arrangement of the first skin 12, the central layer 14 and the second skin 16 is reversed. In this case, the method remains unchanged except for reversing the order of steps b), c) and d), thus arranging the second skin 16 first then securing the central layer 14 thereto and, lastly, securing the first skin 12 to the central layer 14.

As regards the thermoplastic polymeric materials used in the method for manufacturing the various components of the sound-absorbing panel, the above-described specific embodiments shall be considered as being given purely by way of non-limiting examples. In particular, thermoplastic materials that have an operating temperature comprised between about −70° C. and about 120° C., sufficient resistance to external contaminants (oil, fuel and de-icing fluids), sufficient structural resistance and sufficient resistance to impact, according to the usual requirements of aeronautical components, are suitable for being used in the method according to the invention.

In the most preferable embodiment of the manufacturing method according to the present invention, the first skin 12, the central layer 14 and the second skin 16 are all made of the same thermoplastic polymeric material, and are secured together by means of a thermal welding process, and with the use of a structural adhesive layer. In this case, a first thermal weld may be performed to secure the first skin 12 and the central layer 14 together, and a second thermal weld may be performed to secure the central layer 14 and the second skin 16 together.

In another preferable embodiment of the manufacturing method according to the present invention, the first skin 12 is made of a thermoplastic polymeric material, the central layer 14 is made of a composite material reinforced with glass fibre, and the second skin 16 is made of a composite material with an epoxy resin base and reinforced with carbon fibres. In this embodiment, the first skin 12, the central layer 14 and the second skin 16 are secured together two by two by simple gluing, that is to say by arranging respective layers of structural adhesive layers interposed between the first skin 12 and the central layer 14 and between the central layer 14 and the second skin 16 respectively.

In general, a sound-absorbing panel obtained by means of a method according to the present invention may be used in any aeronautical environment in which it is necessary to attenuate a sound impact or reduce a transmission of noise, as in an engine nacelle.

As illustrated by the above description, the manufacturing method according to the present invention offers various advantages.

Firstly, by virtue of the possibility of using a simple mechanical process like punching in order to make the micro-holes, the cost and time required to produce the sound-absorbing panel are considerably reduced.

Furthermore, by virtue of the use of a polymeric material to make the first skin with micro-holes, the weight of the sound-absorbing panel is reduced, with clear advantages for aero-nautical applications.

Lastly, the simplicity of the mechanical technique for making the micro-holes enables maximum flexibility in varying the hole-making pattern, both in terms of dimension of the micro-holes and in terms of position and number thereof.

Finally, by virtue of the use of thermoplastic materials also in making the central layer, it is possible to obtain complex forms and different acoustic cavities.

The principle of the invention remaining unchanged, embodiments and constructional details may be extensively varied with respect to those described and illustrated herein purely by way of non-limiting example, without thereby departing from the scope of protection as described and claimed herein.

The invention claimed is:

1. A method for manufacturing a sound-absorbing panel with a sandwich structure and having a shape of portions of cylindrical surfaces, for reducing noise impact of an aeronautic engine, the method comprising the following steps in sequence:
    a) providing a first skin of a thermoplastic polymeric material;
    b) making a plurality of micro-holes through the first skin by mechanical punching of the first skin;
    c) having the first skin undergo a process of thermoforming on a mold;
    d) securing said first skin to a central layer by arranging a structural adhesive layer between the first skin and the central layer; and
    e) securing said central layer to a second skin by arranging a structural adhesive layer between the central layer and the second skin;
    wherein at least two adjacent components among the first skin, the central layer, and the second skin comprise uncured polymerizable material; and
    wherein step d) and/or step e) further comprises the step of:
        f) having the first skin, the central layer, and the second skin undergo a curing process in autoclave with vacuum bag, according to a specific pressure and temperature cycle, for co-curing the uncured components.

2. The method of claim 1, wherein step d) further comprises securing said first skin to said central layer by a thermal weld between said first skin and said central layer, and wherein step e) further comprises securing said central layer to said second skin by a thermal weld between said central layer and said second skin.

3. A sound-absorbing panel obtained by a method comprising the following steps in sequence:
    a) providing a first skin of a thermoplastic polymeric material;
    b) making a plurality of micro-holes through the first skin by mechanical punching of the first skin;
    c) having the first skin undergo a process of thermoforming on a mold;
    d) securing said first skin to a central layer by arranging a structural adhesive layer between the first skin and the central layer; and
    e) securing said central layer to a second skin by arranging a structural adhesive layer between the central layer and the second skin;
    wherein at least two adjacent components among the first skin, the central layer, and the second skin comprise uncured polymerizable material; and
    wherein step d) and/or step e) further comprises the step of:
        f) having the first skin, the central layer, and the second skin undergo a curing process in autoclave with vacuum bag, according to a specific pressure and temperature cycle, for co-curing the uncured components.

4. The sound-absorbing panel of claim 3, wherein the central layer is made of a thermoplastic material, or aluminium, or a material with a meta-aramid base, or a composite material with a phenolic resin base reinforced with glass fibres.

5. The sound-absorbing panel of claim 3, wherein the central layer has a honeycomb structure.

6. The sound-absorbing panel of claim 3, wherein the second skin is made of a polymeric material or of a composite material with a thermosetting polymeric matrix and a fibre reinforcement.

7. The sound-absorbing panel of claim 3, wherein the first skin is made of a thermoplastic polymer material selected from the group consisting of polyether-ether-ketone (PEEK), polyether-ketone (PEK), polyether-imide (PEI), nylon, polyethylene terephthalate (PET), poly-aryl-ether-ketone (PAEK), poly-para-phenyl-sulphide (PPS), polyamide (PA), poly-phenyl-sulfone (PPSU), poly-carbonate (PC) and polypropylene (PP).

8. The sound-absorbing panel of claim 3, wherein the first skin has a thickness comprised between about 300 and about 1500 micrometres.

9. The sound-absorbing panel of claim 3, wherein the micro-holes cover a percentage of an area of the first skin comprised between about 3% and about 50%.

10. The sound-absorbing panel of claim 3, wherein the micro-holes have a diameter comprised between about 100 micrometres and about 3000 micrometres.

11. The sound-absorbing panel of claim 4, wherein the central layer is made of a thermoplastic material and has a three-dimensional structure formed by a plurality of walls that are mutually converging and/or intersecting, said plurality of walls being adapted to distance the first skin from the second skin, and to define, between the first skin and the second skin, a plurality of resonance chambers of variable geometry, each resonance chamber being in communication with an outside of the sound-absorbing panel through at least one micro-hole of the first skin.

12. An aircraft engine nacelle comprising a sound-absorbing panel according to claim 3.

13. The sound-absorbing panel of claim 3, wherein the first skin has a thickness comprised between about 500 and about 1200 micrometres.

14. The sound-absorbing panel of claim 3, wherein the micro-holes cover a percentage of an area of the first skin comprised between about 3% and about 15%.

15. The sound-absorbing panel of claim 3, wherein the micro-holes have a diameter comprised between about 1000 and about 1500 micrometres.

16. The sound-absorbing panel of claim 3, having a sandwich structure.

17. The sound-absorbing panel of claim 6, having a shape of portions of cylindrical surfaces.

18. The sound-absorbing panel of claim 3, having a shape of portions of cylindrical surfaces.

\* \* \* \* \*